Patented Aug. 1, 1939

2,167,970

UNITED STATES PATENT OFFICE 2,167,970

PROCESS FOR SEPARATION OF WAX FROM OIL

Ulric B. Bray, Palos Verdes Estates, Calif., assignor to Union Oil Company of California, Los Angeles, Calif., a corporation of California Application December 18, 1933, Serial No. 702,985

2 Claims. (Cl. 196—18)

This invention relates to the treatment of oils, such as mineral lubricating oils by the removal of wax associated therewith and by extraction with selective solvents.

It has been found that desirable paraffinic hydrocarbons can be separated from the undesirable olefinic, naphthenic and/or aromatic compounds by the use of solvents which selectively dissolve the undesirable hydrocarbons but which exhibit only a very limited solvent power upon the desirable paraffinic hydrocarbons.

When I use the term "paraffinic hydrocarbons" I mean those highly saturated compounds which are present in petroleum characterized by a low temperature viscosity susceptibility, i. e. they exhibit a minimum change in viscosity for a given change in temperature, and characterized by relative stability to air and sunlight, exhibiting little tendency toward discoloration or sludge formation. This definition is not meant to include those compounds which are usually solid or semi-solid at ordinary temperatures and which are known as "wax" or "petrolatum". As a matter of convenience hereafter, I will refer to the undesirable components, such as olefinic, naphthenic and/or aromatic hydrocarbons, as the "non-paraffinic" components of petroleum. These fractions are characterized by a relatively high temperature viscosity susceptibility and are relatively unstable to air and sunlight, exhibiting discoloration and sludge formation.

A number of selective solvents for extraction have been found; for example, it has been shown that such materials as liquid sulphur dioxide, beta beta dichlorethyl ether, chloraniline, nitrobenzene, aniline and furfural are highly selective as solvents for the non-paraffinic hydrocarbons. When these relatively heavy solvents are commingled with petroleum or petroleum fractions under the proper conditions of temperature, the undesirable non-paraffinic hydrocarbons pass into solution to a greater or less extent but the desirable paraffinic hydrocarbons remain largely undissolved. The solution of undesirable hydrocarbons and solvent settles to the bottom of the container and forms what is known as an extract phase. The relatively light paraffinic hydrocarbons rise to the top of the vessel and form a raffinate phase. These phases are then readily separable by ordinary decantation means. The raffinate phase is usually found to contain a small quantity of the selective solvent and the extract phase ordinarily contains a relatively large quantity of the solvent. These fractions may be purified by distillation whereby the solvent is distilled away from the hydrocarbon oils.

In order to produce a commercially valuable oil it is also necessary to remove therefrom its wax components.

I have found that the selective solvents disclosed above can be more effectively employed to separate the non-paraffinic fractions in the oil by modifying these solvents with highly soluble, non-selective material which is also capable of serving as a diluent and wax precipitant in dewaxing. In my applications Serial Nos. 680,718 and 680,719 filed July 17, 1933, I have disclosed that by the addition of such modifying agents as carbon bisulphide, xylol, benzol, toluol, carbon tetrachloride, ethers or tetrachlorethane to selective solvents, the solvent power of the latter is increased whereby more of the undesirable non-paraffinic oil will be taken into solution leaving a high grade raffinate.

In my application, Serial No. 466,189, filed July 7, 1930, I have also disclosed that wax-containing oil can be dewaxed in the presence of liquid normally gaseous hydrocarbons, such as liquid ethane, propane, butane or mixtures of the same. These hydrocarbons function as wax precipitants and as diluents whereby the viscosity of the oil is reduced and the wax more readily settles. Also, part or all of these hydrocarbons may be vaporized in the presence of the waxy oil whereby the wax precipitates by internal refrigeration.

However, I have found that when these solvent extraction and dewaxing processes are combined, that is, when the extraction with selective solvent takes place in the presence of one or more of the above mentioned wax precipitants, the wax precipitant is not completely soluble in the selective solvent and remains dissolved almost entirely in the raffinate phase. On account of the low solubility of these saturated normally gaseous hydrocarbons such as liquid propane in the selective solvent, the presence of these normally gaseous hydrocarbons tends to retard the solution of the lubricating fractions in the selective solvent. It is my intention that the function of the modifier is to increase the solubility of the lubricating fractions in the selective solvent and in order to accomplish this object I have found that it is desirable to use as a modifier those materials which are miscible in all proportions with the selective solvent. Such modifying agents tend to increase the solubility of the lubricating fractions in the selective solvent and therefore they may be distinguished from saturated liquid normally gaseous hydrocarbons.

It is an object of my invention economically to subject oil to solvent extraction and to dewaxing.

It is a further object of the present invention to extract an oil with a selective solvent modified by the addition of a substance capable of activating the solvent power of the selective solvent to make the latter more efficient and also capable of serving as a diluent and wax precipitant during wax precipitation of said oil.

It is another object of my invention to dewax wax containing oil in the presence of a wax precipitant which is characterized by its ability to increase the solvent power of a selective solvent and then to extract the dewaxed oil by a selective solvent in the presence of this wax precipitant.

This activating agent may be either higher or lower boiling than the selective solvent. For instance, if the selective solvent is liquid sulphur dioxide, a higher boiling activating agent may be methylene chloride, ethylene dichloride, toluene, cyclohexene or the like. Activating agents boiling lower than sulphur dioxide are ethylene, propylene, butylene, isobutylene, cyclopropylene and the like. These agents are capable of activating the selective solvent during extraction by increasing its solvent power and also aid during dewaxing. It is evident that other selective solvents and other activating agents capable of aiding wax precipitation can be employed according to my invention. For instance, my activating agent may be a cracked gasoline stabilizer overhead containing 15 to 20% or more unsaturated hydrocarbons.

Figure 1:
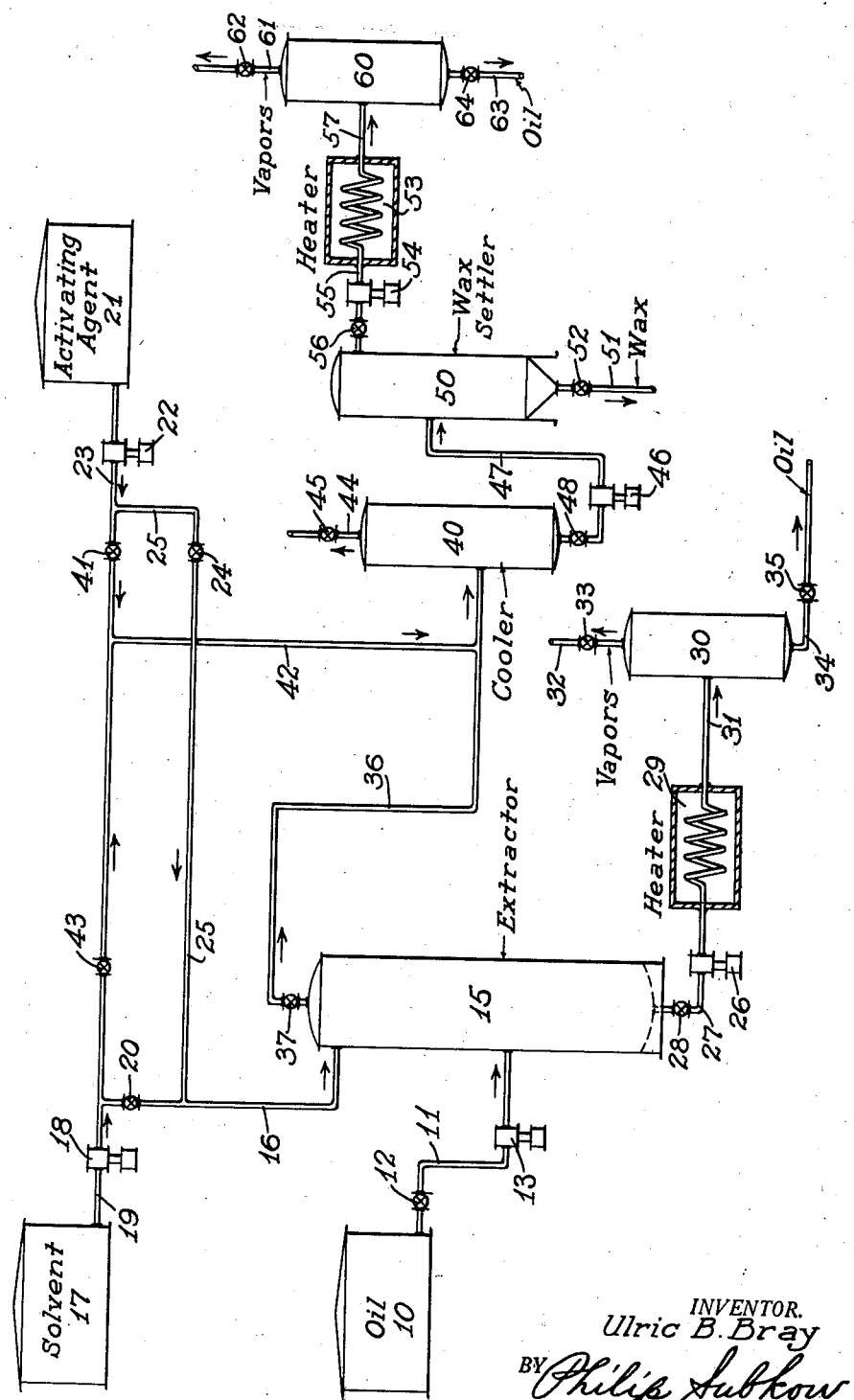
Figure 1 is a diagrammatic view of apparatus suitable for carrying out my process when the activating agent is higher boiling than the selective solvent.

Referring to Figure 1, oil, such as lubricating oil containing wax, is introduced into the system from stock tank 10 via line 11 controlled by valve 12 by action of pump 13 into extraction column 15. In this column the oil is preferably passed in a countercurrent manner with one of the above mentioned selective solvents introduced through line 16, either alone or with an agent such as benzol which increases the solvent power of the selective solvent without increasing its dewaxing properties. For example, this solvent may be liquid sulphur dioxide passed from tank 17 by action of pump 18 via line 19, valve 20 and line 16. To the selective solvent there is introduced one or more of the above mentioned activating materials characterized by a boiling point higher than that of the selective solvent. For instance, methylene chloride may pass from tank 21 by action of pump 22 through line 23, valve 24 in line 25 and through line 16 into the extractor 15. Extract phase is removed from the extractor by action of pump 26 in line 27 controlled by valve 28 and is passed through heater 29 in which its temperature is increased sufficiently to vaporize the solvent and activating material from the extracted oil in separator 30 to which the heated extract phase passes via line 31. Vapors issue through line 32 controlled by valve 33. Extracted oil is passed from the system through line 34 controlled by valve 35.

Raffinate phase from extractor 15 is removed therefrom through line 36 controlled by valve 37 into cooling chamber 40. A portion of the activating material may be introduced into line 36 from line 23 by passage through valve 41 and line 42 which connects therewith. Additional selective solvent may likewise be introduced into line 36 by passage through line 19, valve 43 and line 42. Preferably, the pressure existing in refrigerating chamber 40 is sufficiently reduced to cause at least partial vaporization of the selective solvent when normally gaseous selective solvent is employed and these vapors escape via line 44 controlled by valve 45. The temperature of the mixture in chamber 40 is reduced sufficiently, preferably by internal refrigeration of at least part of the selective solvent to cause precipitation of wax. If desired, external or other cooling may be provided. The wax and oil slurry is passed into separator 50 by action of pump 46 through line 47 controlled by valve 48. Wax is removed from separator 50 through line 51 controlled by valve 52. Dewaxed oil, activating material and remaining selective solvent are heated in heater 53 after passage by action of pump 54 through line 55 controlled by valve 56. The heated mixture travels through line 57 into separator 60 from which the vapors of added materials are removed via line 61 controlled by valve 62. The dewaxed high quality raffinate is removed from separator 60 via line 63 controlled by valve 64.

In operation of the apparatus illustrated by Figure 1, the pressure and temperature conditions in extractor 15 are preferably sufficient to maintain the selective solvent and activating agent in the liquid phase and to cause phase separation for the production of the desired grade of raffinate. In some cases it may be desired to extract the oil with selective solvent unmixed with activating agent, such as methylene chloride, in which event valve 24 will be closed and all the activating agent introduced into the system will pass via line 42 into contact with the raffinate phase travelling through line 36. The raffinate phase issuing from extractor 15 comprises the desirable paraffinic oil containing wax and a small proportion of selective solvent together with a portion of the activating material. If sufficient normally gaseous selective solvent is not present in the raffinate to create the desired degree of internal refrigeration in cooler 30 by pressure reduction with consequent vaporization, added quantities of this solvent may be introduced into the raffinate in line 36 in the above described manner. For brevity, the recovery of added material from the raffinate and extracted oil has been disclosed as single stage distillations. However, the selective solvent and activating medium may be separately recovered by usual means, such as by two stage distillation and separate condensation. These materials can be returned to their respective stock tanks for reuse.

As an example of the operation of the apparatus shown in Figure 1, a lubricating oil distillate obtained from crude mineral oil is selectively extracted with 350 volume percent. liquid sulphur dioxide in the presence of 75 volume percent. methylene chloride in extractor 15 at 60° F. To the raffinate thus obtained, sufficient liquid sulphur dioxide is added to provide the desired amount of vaporization and internal refrigeration in cooler 40 in which the temperature may be reduced to −10° F. to precipitate the wax. If the selective solvent employed is not normally gaseous, other means may be provided to lower the temperature of the wax containing raffinate. The liquid sulphur dioxide is not only a refrigerant; it also is an anti-solvent for the wax, forcing the wax into the solid state. Therefore, it is preferred to keep some of the sulphur dioxide unvaporized in cooler 40. Any sulphur dioxide or methylene chloride present in the wax issuing from settler 50 can be recovered by distillation. The sulphur dioxide associated with the extract and raffinate can be removed therefrom by proper control of heaters 29 and 53, respectively. The methylene chloride can be distilled off from these fractions at a higher temperature and can be separately condensed.

In some instances, the partition into the extract and raffinate phases of the oil, selective solvent and activating agent present in the proper proportions for solvent extraction does not result in the desired proportions of these materials in the raffinate for dewaxing. As one example, the raffinate produced by extraction of oil with liquid sulphur dioxide in the presence of methylene chloride comprised one volume of oil, 0.15 volume methylene chloride and 0.2 volume liquid sulphur dioxide. The extract from this extraction comprised 0.3 volume oil, 0.65 volume methylene chloride and 3.8 volumes liquid sulphur dioxide.

During dewaxing of the above mentioned raffinate the reduction in temperature for wax precipitation also results in a further separation into two liquid phases. In order to prevent this phase separation during dewaxing more methylene chloride may be added via line 42 to increase the solubility of the selective solvent for the oil. For example, methylene chloride may be added to the raffinate flowing via line 36 in sufficient amount to produce the following desirable proportions during dewaxing: 1 volume oil, 2 volumes methylene chloride, 0.2 volume liquid sulphur dioxide.

When Kettleman Hills lubricating oil characterized by a gravity of 20.7° A. P. I., carbon residue of 1.2 weight percent., viscosity of 88 seconds Saybolt at 210° F. and viscosity gravity constant of 0.863, is extracted with a selective solvent such as liquid sulphur dioxide in the absence of an activating agent and dewaxed, the dewaxed raffinate thus obtained has the following properties: gravity 25.0° A. P. I., carbon residue of 0.20 weight percent., viscosity of 76 seconds at 210° F. and viscosity gravity constant of 0.833.

When the above described lubricating oil is extracted with liquid sulphur dioxide in the presence of an activating agent such as methylene chloride and dewaxed according to the process disclosed herein, the dewaxed raffinate thus obtained has a gravity of 28.8° A. P. I., carbon residue of 0.05 weight percent., viscosity of 70 seconds at 210° F. and viscosity gravity constant of 0.808.

Not only does the activating agent result in a higher quality raffinate with lower carbon residue and lower viscosity gravity constant, it also aids in the dewaxing of the raffinate by acting as a diluent whereby the wax settles more readily from the oil and by acting as a wax precipitant.

The above mentioned viscosity gravity constant is an index of the paraffinicity or naphthenicity of an oil. A high value represents a high degree of naphthenicity while low values indicate relatively greater paraffinicity. This constant is determined by the method employed by Hill and Coates as set forth in the Journal of Industrial and Engineering Chemistry, vol. 20, page 641, of 1928.

As previously stated, the activated material may be lower boiling than the selective solvent. Apparatus suitable for this condition is shown in Figure 2.

Figure 2:
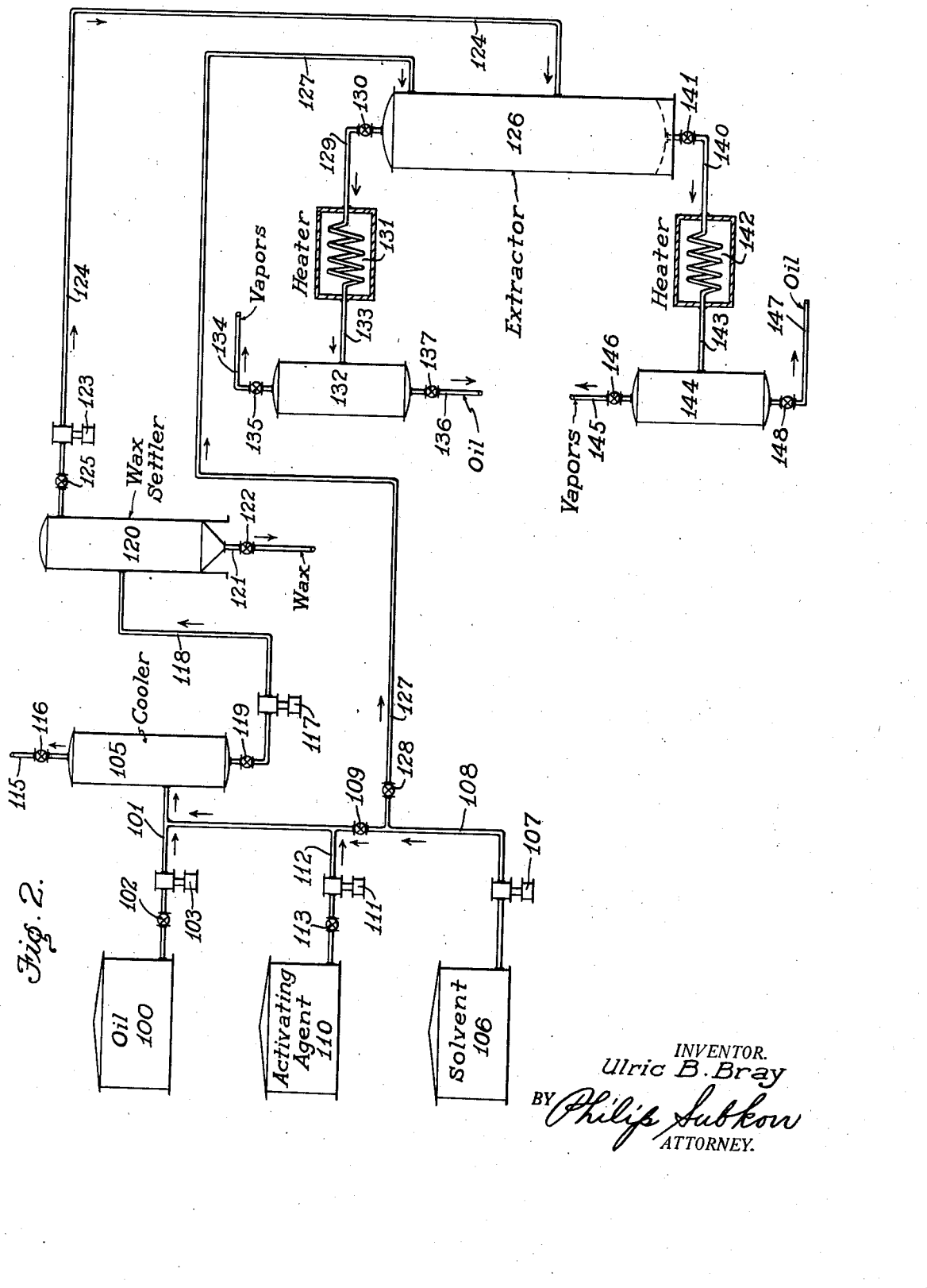
Figure 2 is a diagrammatic view of apparatus suitable for use when the activating agent is lower boiling than the selective solvent.

Referring to Figure 2, lubricating oil containing wax from stock tank 100 passes through line 101 controlled by valve 102 by action of pump 103 into cooling chamber 105. To the oil flowing through line 101 there may be introduced a regulated amount of selective solvent, such as liquid sulphur dioxide, passing from tank 106 by action of pump 107 through line 108 controlled by valve 109 and connected with line 101. To the oil passing through line 101 there is also introduced one of the above mentioned activating agents characterized by a boiling point lower than that of the selective solvent. From tank 110 this activating agent passes by action of pump 111 through line 112 controlled by valve 113 and through line 108 connecting with line 101. Although usually desirable, in some instances it may be preferred to dewax the oil in the absence of a selective solvent in which event valve 109 is closed and only activating agent passes to line 101 through lines 112 and 108.

The pressure in cooling zone 105 is preferably reduced to evaporate sufficient amounts of the activating agent to cause internal refrigeration and precipitation of the wax content of the oil. Of course, other refrigeration such as by external means may be employed. Vapors are removed from chamber 105 via line 115 controlled by valve 116. These vapors are condensed for reuse. The wax and oil slurry associated with selective solvent and remaining activating agent is forced by action of pump 117 through line 118 controlled by valve 119 into wax settler 120 from which the wax is removed via line 121 controlled by valve 122. In place of or in combination with wax settling, the wax may be removed by other means such as by filtration or centrifuging.

The dewaxed oil is removed from settler 120 by action of pump 123 through pipe 124 controlled by valve 125. The dewaxed oil is then subjected to extraction with a selective solvent in extractor 126. Additional quantities of the selective solvent may be introduced into the extractor from tank 106 via line 108 controlled by valve 109 and via line 127 controlled by valve 128. The raffinate phase exits from the extractor through line 129 controlled by valve 130 and passes through heater 131 where its temperature is sufficiently increased to vaporize the solvent and activating agent in separator 132, to which the heated mixture passes through line 133. Vapors are removed through line 134 controlled by valve 135. Recovered raffinate exits from separator 132 through line 136 controlled by valve 137. The extract phase from extractor 126 issues through line 140 controlled by valve 141 and passes through heater 142 to increase its temperature for the vaporization of selective solvent and activating material. The heated mixture passes through line 143 into separator 144 from which vapors are removed via line 145 controlled by valve 146 and the recovered extracted oil is removed through line 147 controlled by valve 148.

In the operation of the apparatus shown in Figure 2, the amount of activating agent which is introduced into the oil flowing through the line 101, is preferably sufficient to cause the desired degree of cooling in chamber 105 by partial vaporization thereof, whereby enough of the activating agent remains in the liquid state to modify the selective solvent in extractor 126 to the desired extent. If the vaporization in 105 reduces the amount of activating material remaining present in the oil flowing through line 124, additional quantities of this material may be directly introduced therein.

Preferably the selective solvent introduced into the oil prior to dewaxing also functions as a wax anti-solvent because no separation into extract and raffinate phases in settler 120 is desired. It is preferred to introduce into line 101 a quantity of selective solvent which is less than that necessary to saturate the oil at the lowest temperature to which it is chilled, whereby said solvent acts as a wax anti-solvent without phase separation. In case this quantity is exceeded and a solvent phase appears, this solvent phase is preferably separated from the main body of the liquid before separating the wax. Additional quantities of selective solvent may then be introduced into extraction column 126 via lines 108 and 127 to cause phase separation therein. A temperature control may be established in line 124 by introducing a heater or cooler therein as desired, to cause the oil to enter extractor 126 at the appropriate temperature.

In some instances, the proportion of activating agent present in the oil after dewaxing is so large that excessive quantities of selective solvent are necessary to cause phase separation. As one example of dewaxing in the presence of a selective solvent and an activating agent the dewaxed oil phase comprised one volume oil, two volumes propylene and 0.25 volume liquid sulphur dioxide. This mixture flowing through line 124 was subjected to vaporization and removal of the excess quantity of propylene before entrance into extractor 126. Extraction took place therein while the materials were present in the following proportions: 1 volume oil, 1 volume propylene and 3 volumes liquid sulphur dioxide. The latter to the extent of 2.75 volumes was introduced into 126 via line 127.

As another example of the operation of the apparatus described in Figure 2, oil having the same characteristics as the oil described in relation to Figure 1 may be mixed with 30 volume percent. liquid sulphur dioxide, and 200 volume percent. liquid propylene. Pressure may be sufficiently reduced on this mixture to cause precipitation of wax in chamber 105, for instance to —30° F. with introduction of propylene to affect the loss of propylene by evaporation. The liquid sulphur dioxide functions as a wax precipitant in this stage. The excess propylene is removed from the dewaxed oil solution which is countercurrently extracted with 400 volume percent. liquid sulphur dioxide introduced through line 127. The dewaxed raffinate thus obtained is characterized by a gravity of 28.0° A. P. I., viscosity of 77 seconds Saybolt at 210° F., carbon residue of 0.05 volume percent. and viscosity gravity constant of 0.811. This raffinate is of higher quality than dewaxed raffinate produced by extraction with a selective solvent such as sulphur dioxide alone.

As a modification of my process, the dewaxing in the presence of the wax precipitant may be entirely in the absence of a selective solvent. The latter may be contacted with the dewaxed oil containing wax precipitant only in extractor 126. If the wax precipitant is a liquid normally gaseous substance, the pressure may be sufficiently reduced in cooling chamber 105 to cause partial vaporization of the wax precipitant with cooling and consequent wax precipitation. Because my wax precipitant also has modifying properties for the selective solvent, I prefer to retain sufficient wax precipitant in the dewaxed oil to obtain the desired amount of solubility of the solvent during extraction of this mixture.

My invention may also be accomplished by extracting with a selective solvent a mixture of waxy oil and activating material to separate a raffinate comprising wax, oil, activating material and selective solvent retained therewith from the extract phase. The activating material is one of those characterized by ability to increase the solvent power of a selective solvent and is also characterized as a wax precipitant. If the activating material is a liquid, normally gaseous substance, the pressure can be reduced on the raffinate phase to partially evaporate the activating material, cooling the waxy raffinate by internal refrigeration whereby the wax is precipitated in the presence of the remaining activating agent.

Many modifications of the above described invention are possible within the scope of the claims, for instance, the extraction may advantageously take place in two or more stages, whereby the raffinate from the first stage is again extracted to produce a high grade raffinate, and an intermediate grade extract. In this event, the second extraction may be accomplished by a solvent having greater solvent power than the solvent used in the first extraction. For instance, liquid sulphur dioxide may be used for the primary extraction and the second extraction can be accomplished by liquid sulphur dioxide admixed with one or more modifying agents such as methylene chloride, ethylene chloride, toluene, cyclohexene, ethylene, propylene, butylene, isobutylene, cyclopropylene or other similar agents which increase the solvent power of the selective solvent and also aid in dewaxing. Of course, it is evident that other selective solvents can also be used. The selective solvent employed in the second extraction in the presence of a modifying agent may be the same or different from the selective solvent used in the first extraction.

The description and examples are merely illustrative of preferred operations and many variations thereof may be made by a person skilled in the art, within the scope of the following claims.

I claim:

1. The process for the separation of wax from a wax-bearing oil which comprises commingling said oil with a selective solvent and cyclopropylene, cooling the diluted oil to a temperature sufficiently low to precipitate wax and removing the wax from the cooled oil.

2. A process according to claim 1 in which the selective solvent is sulfur dioxide.

ULRIC B. BRAY.